(12) United States Patent
He et al.

(10) Patent No.: US 12,522,382 B2
(45) Date of Patent: Jan. 13, 2026

(54) METHOD AND DEVICE FOR CONTROLLING FLIGHT OF UAV, AND UAV

(71) Applicant: AUTEL ROBOTICS CO., LTD., Shenzhen (CN)

(72) Inventors: Ao He, Guangdong (CN); Kangli Wang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 325 days.

(21) Appl. No.: 18/336,128

(22) Filed: Jun. 16, 2023

(65) Prior Publication Data

US 2024/0085929 A1   Mar. 14, 2024

(30) Foreign Application Priority Data

Jun. 17, 2022   (CN) .......................... 202210692405.0

(51) Int. Cl.
*B64U 10/20*   (2023.01)
*B64U 50/30*   (2023.01)
*G05D 1/00*   (2024.01)

(52) U.S. Cl.
CPC ............. *B64U 10/20* (2023.01); *B64U 50/30* (2023.01); *G05D 1/102* (2013.01); *B64U 2201/00* (2023.01)

(58) Field of Classification Search
CPC .... B64U 10/20; B64U 50/30; B64U 2201/00; B64U 10/25; B64U 30/294; B64U 30/297;

(Continued)

(56) References Cited

U.S. PATENT DOCUMENTS

2018/0222580 A1\* 8/2018 DeLorean ............... B64C 39/04
2021/0253234 A1\* 8/2021 Tao .......................... B64C 27/26
(Continued)

FOREIGN PATENT DOCUMENTS

CN      108706099 A    10/2018
CN      208149601 U    11/2018
(Continued)

OTHER PUBLICATIONS

Extended European Search Report issued Oct. 12, 2023 by EPO; Appln. No. 23176454.9.

(Continued)

*Primary Examiner* — Anne Marie Antonucci
*Assistant Examiner* — Jodi Jones
(74) *Attorney, Agent, or Firm* — Frank Gao, Esq.

(57) ABSTRACT

A method and device for controlling a flight of an unmanned aerial vehicle (UAV) is provided. The UAV includes a fuselage, two wings, two supporting arms, two rotor wing structures, two second power modules, two third power modules, two steering modules, a lifting module, an altitude sensor, and a speed sensor. The two wings are fixed to the fuselage, the supporting arms are fixed to the wings, the rotor wing structure includes a first power module and a driving module, the driving module of the rotor wing structure is fixed to the supporting arm, and the driving module is configured to drive the first power module to rotate such that the first power module switches between the level flight mode and the lifting mode.

20 Claims, 12 Drawing Sheets

(58) Field of Classification Search
CPC .... G05D 50/30; G05D 1/102; B64C 29/0033; B64C 29/0025; B64C 27/08; B64C 27/12; B64C 27/14; B64C 27/26; B64C 27/28; B64C 27/52; Y02T 50/40
USPC ............ 701/3, 2, 4, 16, 11, 1, 7, 36, 5, 124
See application file for complete search history.

(56) References Cited

U.S. PATENT DOCUMENTS

2022/0281599 A1* 9/2022 Tian .................... G05D 1/0072
2024/0395154 A1* 11/2024 Pearson ................. G08G 5/80

FOREIGN PATENT DOCUMENTS

| | | |
|---|---|---|
| CN | 109969392 A | 7/2019 |
| CN | 210526849 U | 5/2020 |
| CN | 113830303 A | 12/2021 |
| CN | 215514102 U | 1/2022 |
| CN | 114537654 A | 5/2022 |
| CN | 114560080 A | 5/2022 |
| CN | 217864731 U | 11/2022 |
| EP | 2897863 B1 | 11/2020 |
| EP | 3998209 A1 | 5/2022 |
| JP | 2001071998 A | 3/2001 |
| KR | 20200080825 A | 7/2020 |
| KR | 102355526 B1 | 2/2022 |

OTHER PUBLICATIONS

The First Chinese Office Action dated Jan. 15, 2025; Appln. No. 202210692405.0 with English Translation.

* cited by examiner

S209 — According to a climbing command, control the lifting module to deflect upwards and control two first power modules to accelerate

FIG. 13

S210 — According to a descending command, control the lifting module to deflect downwards and control two first power modules to decelerate

FIG. 14

S211 — According to a steering command, deflect the steering module corresponding to the steering command upwards, deflect the other steering module downwards, and control two first power modules to accelerate

FIG. 15

METHOD AND DEVICE FOR CONTROLLING FLIGHT OF UAV, AND UAV

CROSS-REFERENCE TO RELATED APPLICATIONS

This application claims priority of Chinese Patent Application No. 202210692405.0, filed on Jun. 17, 2022, entitled as "Method and device for controlling flight of UAV, and UAV", the contents of which are incorporated herein by reference.

BACKGROUND

Technical Field

Embodiments of the present disclosure relate to the field of aeronautical technology, and more particularly to a method and device for controlling the flight of an unmanned aerial vehicle (UAV), and an UAV.

Related Art

Current unmanned aerial vehicle (UAV) are provided with multiple rotor wing structures, and the multiple rotor wing structures are fixed directly to the UAV body. One part of the rotor wing structure is configured to drive the UAV to be vertically raised and lowered, and the other part of the rotor wing structure is configured to drive the UAV to conduct level flight, so that the UAV can fly up and forward.

During the implementation process of embodiments of the present disclosure, the inventors have found that: the manner in which the multiple rotor wing structures are each fixed to the UAV body is such that each rotor wing structure can only provide power to the UAV in a single direction and thus has a single function.

SUMMARY

The main technical problem solved by the embodiments of the present disclosure is to provide a method and device for controlling the flight of an unmanned aerial vehicle (UAV), and an UAV, which can overcome or at least partially solve the above problems.

In order to solve the above technical problem, one technical solution adopted by the embodiments of the present disclosure is: providing a method for controlling the flight of an UAV, the UAV comprising a fuselage, two wings, two supporting arms, two rotor wing structures, two second power modules, two third power modules, two steering modules, a lifting module, an altitude sensor, and a speed sensor, wherein the two wings are respectively fixed to two sides of the fuselage, one of the supporting arms is fixed to one of the wings, the rotor wing structure comprises a first power module and a driving module connected to the first power module, the driving module of one of the rotor wing structures is fixed to one end of one of the supporting arms, and the driving module is configured to drive the first power module to rotate relative to the supporting arm, so that the first power module can switch between a level flight mode and a lifting mode; one second power module is fixed to the other end of one supporting arm, the two third power modules are respectively fixed to a head and a tail of the fuselage, one steering module is respectively provided on one wing, the lifting module is provided on the tail of the fuselage, the altitude sensor is provided on the fuselage or the wing, and the speed sensor is provided on the fuselage or the wing; the method includes: acquiring a flight control command; and according to the flight control command, controlling the driving module to adjust a mode of the first power module and controlling the first power module, the second power module, the third power module, the steering module, and the lifting module.

Optionally, the flight control command comprises a vertical ascending command; the step of according to the flight control command, controlling the driving module to adjust a mode of the first power module and controlling the first power module, the second power module, the third power module, the steering module, and the lifting module comprises: controlling the driving module to adjust the first power module to the lifting mode and turning off the steering module and the lifting module according to the vertical ascending command; and starting the two first power modules, two second power modules, and two third power modules, and adjusting powers of the two third power modules, and two first power modules to cause the UAV to vertically ascend.

Optionally, the flight control command comprises a forward flight command; the step of according to the flight control command, controlling the driving module to adjust a mode of the first power module and controlling the first power module, the second power module, the third power module, the steering module, and the lifting module comprises: acquiring a current altitude of an UAV detected by the altitude sensor according to the forward flight command; judging whether the altitude satisfies a preset altitude; and if the altitude satisfies the preset altitude, controlling powers of the two second power modules and two third power modules so that the UAV is in a hovering state, and controlling the driving module to adjust the two first power modules into a level flight mode so that the UAV flies forward.

Optionally, acquiring the current speed of the UAV detected by the speed sensor; judging whether the speed is greater than or equal to the preset speed; and if the speed is greater than or equal to the preset speed, turning off the two second power modules and two third power modules.

Optionally, the flight control command comprises a climbing command; the step of according to the flight control command, controlling the driving module to adjust a mode of the first power module and controlling the first power module, the second power module, the third power module, the steering module, and the lifting module comprises: according to the climbing command, controlling the lifting module to deflect upwards and controlling the two first power modules to accelerate.

Optionally, the flight control command comprises a descending command; the step of according to the flight control command, controlling the driving module to adjust a mode of the first power module and controlling the first power module, the second power module, the third power module, the steering module, and the lifting module comprises: according to the descending command, controlling the lifting module to deflect downwards and controlling the two first power modules to decelerate.

Optionally, the flight control command comprises a steering command; the step of according to the flight control command, controlling the driving module to adjust a mode of the first power module and controlling the first power module, the second power module, the third power module, the steering module, and the lifting module comprises: according to the steering command, deflecting the steering module corresponding to the steering command upwards, deflecting the other steering module downwards, and controlling the two first power modules to accelerate.

Optionally, the flight control command comprises a vertical landing command; the step of according to the flight control command, controlling the driving module to adjust a mode of the first power module and controlling the first power module, the second power module, the third power module, the steering module, and the lifting module comprises: starting the two second power modules and two third power modules according to the vertical landing command; after the two second power modules and the two third power modules are started, controlling the driving module to adjust the two first power modules to a vertical mode; and adjusting powers of the two third power modules, two second power modules, and two first power modules to cause the UAV to perform the vertical landing.

In order to solve the above technical problem, one technical solution adopted by the embodiments of the present disclosure is: providing a device for controlling the flight of an UAV, the UAV comprising a fuselage, two wings, two supporting arms, two rotor wing structures, two second power modules, two third power modules, two steering modules, a lifting module, an altitude sensor, and a speed sensor, wherein the two wings are respectively fixed to two sides of the fuselage, one of the supporting arms is fixed to one of the wings, the rotor wing structure comprises a first power module and a driving module connected to the first power module, the driving module of one of the rotor wing structures is fixed to one end of one of the supporting arms, and the driving module is configured to drive the first power module to rotate relative to the supporting arm, so that the first power module can switch between a level flight mode and a lifting mode; one second power module is fixed to the other end of one supporting arm, the two third power modules are respectively fixed to a head and a tail of the fuselage, one steering module is respectively provided on one wing, the lifting module is provided on the tail of the fuselage, the altitude sensor is provided on the fuselage or the wing, and the speed sensor is provided on the fuselage or the wing; the device includes an acquisition module and a control module, the acquisition module being configured to acquire a flight control command, and the control module configured to, according to the flight control command, control the driving module to adjust a mode of the first power module and control the first power module, the second power module, the third power module, the steering module, and the lifting module.

In order to solve the above technical problem, another technical solution adopted by the embodiments of the present disclosure is: providing an UAV, the UAV comprising a fuselage, two wings, two supporting arms, two rotor wing structures, two second power modules, two third power modules, a lifting module, two steering modules, an altitude sensor, a speed sensor, and a controller; wherein the two wings are respectively fixed to two sides of the fuselage; one of the supporting arms is fixed to one of the wings; two rotor wing structures, the rotor wing structure comprising a first power module and a driving module connected to the first power module, the driving module of one rotor wing structure is fixed to one end of one supporting arm, and the driving module is configured to drive the first power module to rotate relative to the supporting arm, so that the first power module can switch between a level flight mode and a lifting mode; one second power module is fixed to the other end of one supporting arm; two third power modules are respectively fixed to a head and a tail of the fuselage; the lifting module is provided at the tail of the fuselage; one steering module is provided on one wing; the altitude sensor is provided on the fuselage or the wing; the speed sensor is provided on the fuselage or the wing; a controller comprising a memory and at least one processor, the at least one processing communication is respectively communicatively connected to the memory, two second power modules, two third power modules, the lifting module, the altitude sensor, the speed sensor, the first power module, and the driving module; the memory stores an instruction executable by the at least one processor, the instruction being executed by the at least one processor to enable the at least one processor to execute the method for controlling the flight of the UAV.

Advantageous effects of the embodiments of the present disclosure are as follows: different from the circumstances in the prior art, according to the embodiments of the present disclosure, the first power module is driven to rotate relative to the supporting arm by the driving module so that the first power module can be switched between the level flight mode and the lifting mode, and the first power module can provide power in two directions of level flight power or lifting power; when it is necessary to execute the flight, the first power module, the second power module, the third power module, the steering module, and the lifting module are controlled according to the flight control command to achieve the flight of the UAV.

BRIEF DESCRIPTION OF THE DRAWINGS

In order to illustrate specific embodiments of the present disclosure or the technical solutions in the prior art more clearly, the following will briefly introduce the drawings that need to be used in the description of the specific embodiments or the prior art. Throughout the drawings, like elements or portions are generally identified by like reference numerals. In the drawings, elements or portions may not necessarily be drawn to the actual scale.

FIG. 13 is a flowchart of a method for controlling the climbing of an UAV in an embodiment of the present disclosure;

FIG. 14 is a flowchart of a method for controlling the descending of an UAV in an embodiment of the present disclosure;

FIG. 15 is a flowchart of a method for controlling the steering of an UAV in an embodiment of the present disclosure;

DETAILED DESCRIPTION OF THE DISCLOSURE

Figure 1:
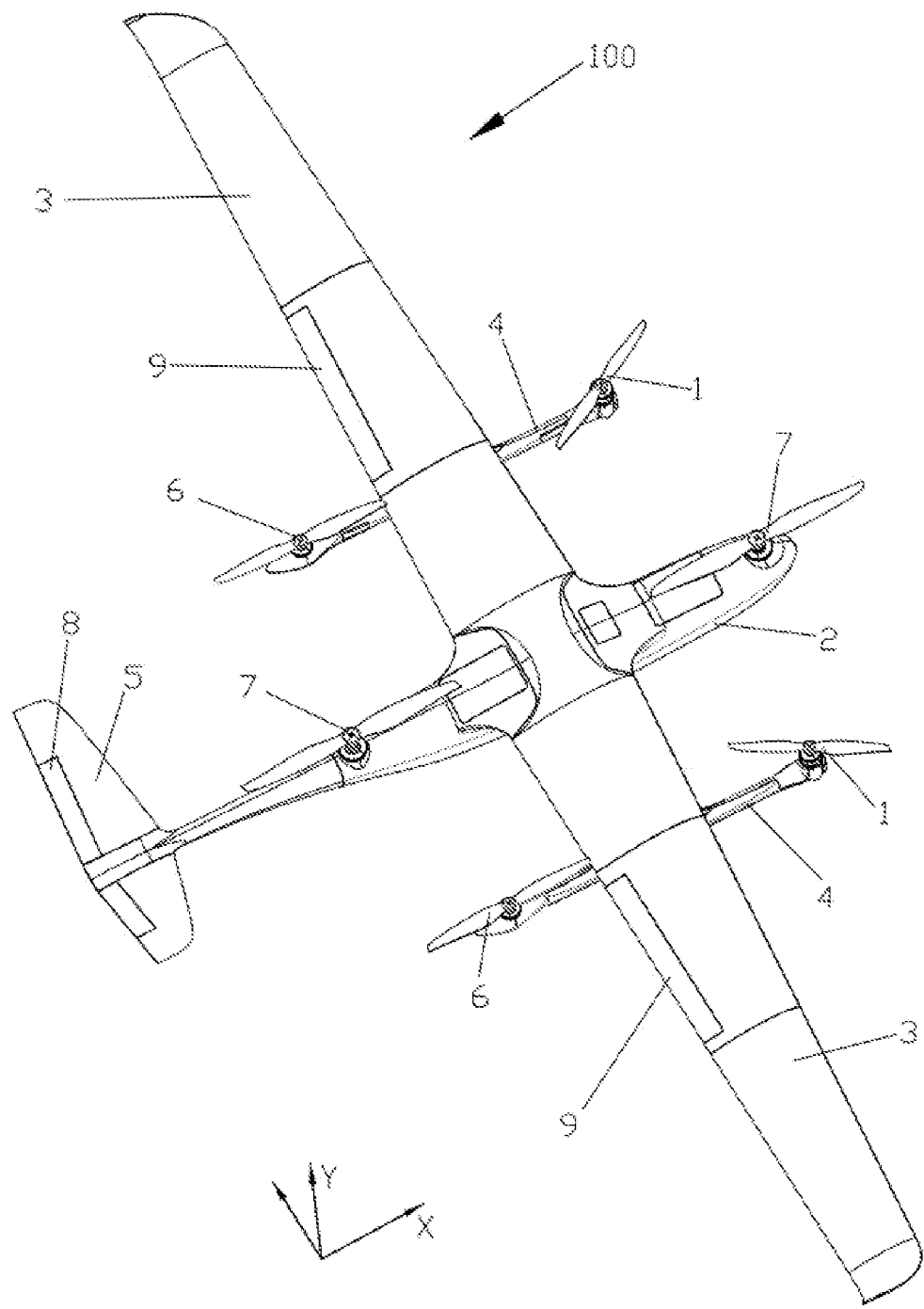
FIG. 1 is a schematic structural diagram of an unmanned aerial vehicle (UAV) in an embodiment of the present disclosure.

In order to make the present disclosure readily understood, a more detailed description of the present disclosure will be rendered with reference to the appended drawings and specific embodiments. It should be noted that when an element is referred to as being "secured" to another element, it can be directly on the other element or one or more intervening elements may be present therebetween. When one element is referred to as being "connected" to another element, it can be directly connected to the other element or one or more intervening elements may be present therebetween. In the description, the orientation or positional relationships indicated by the terms used herein "up", "down", "inside", "outside", "vertical", "horizontal" etc. are based on the orientation or positional relationship shown in the drawings, and are only for the convenience of describing the disclosure and simplifying the description, rather than indicating or implying that the referred device or element must have a specific orientation, or be constructed and operated in a specific orientation, and therefore cannot be construed as a limitation of the present disclosure. Furthermore, the terms "first", "second", etc. are only used for descriptive purposes and are not to be construed as indicating or implying relative importance.

Unless defined otherwise, all technical and scientific terms used in the specification have the same meaning as commonly understood by one of ordinary skill in the art to which the present disclosure belongs. The terminology used in the description of the present disclosure is for the purpose of describing specific embodiments only and is not intended to limit the present disclosure. As used herein, the term "and/or" includes any and all combinations of one or more of the associated listed items.

Furthermore, the technical features involved in the different embodiments of the present disclosure described below can be combined with each other as long as they do not conflict with each other.

Figure 2:
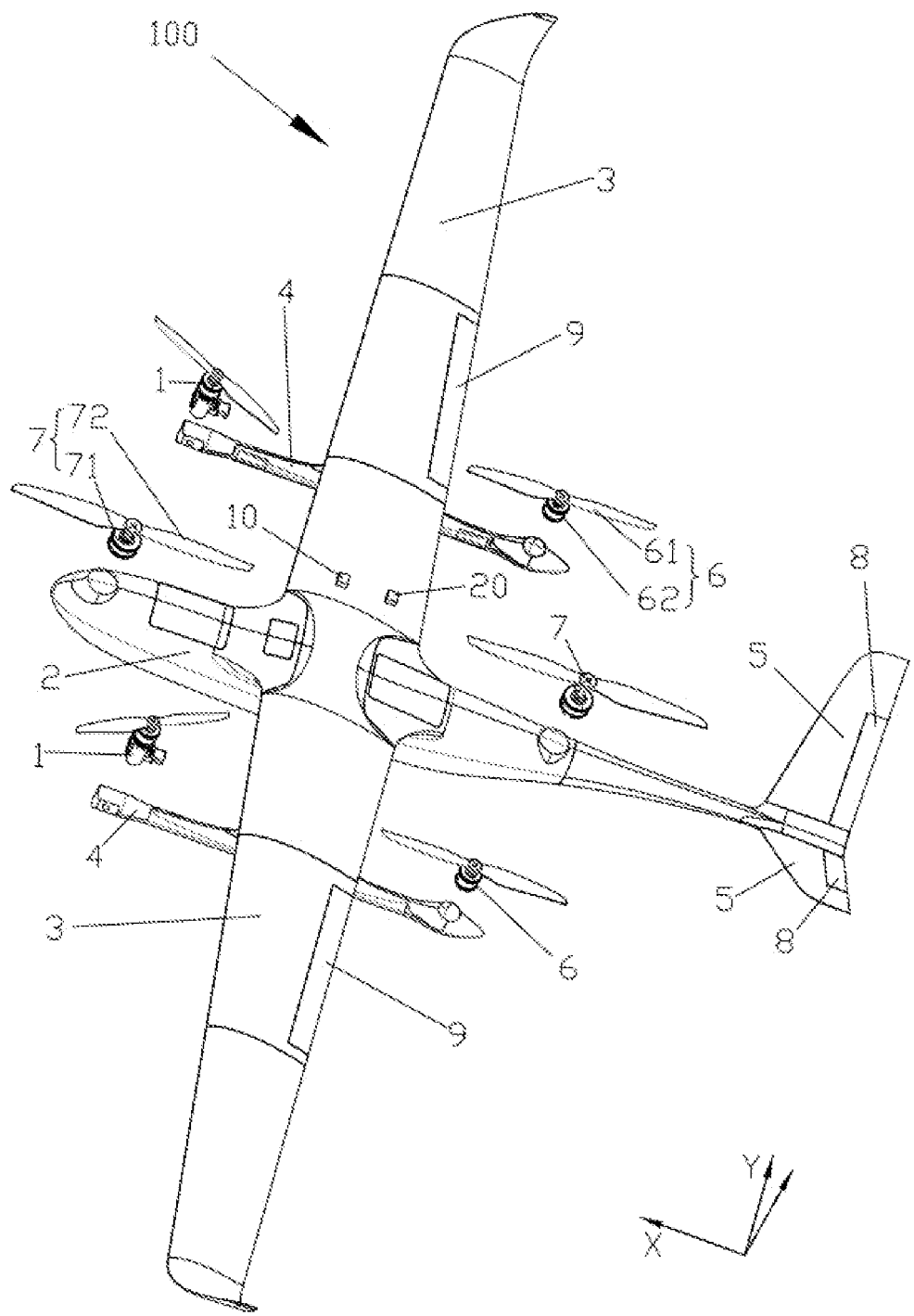
FIG. 2 is a schematic explosive diagram of an UAV in an embodiment of the present disclosure.
Figure 3:
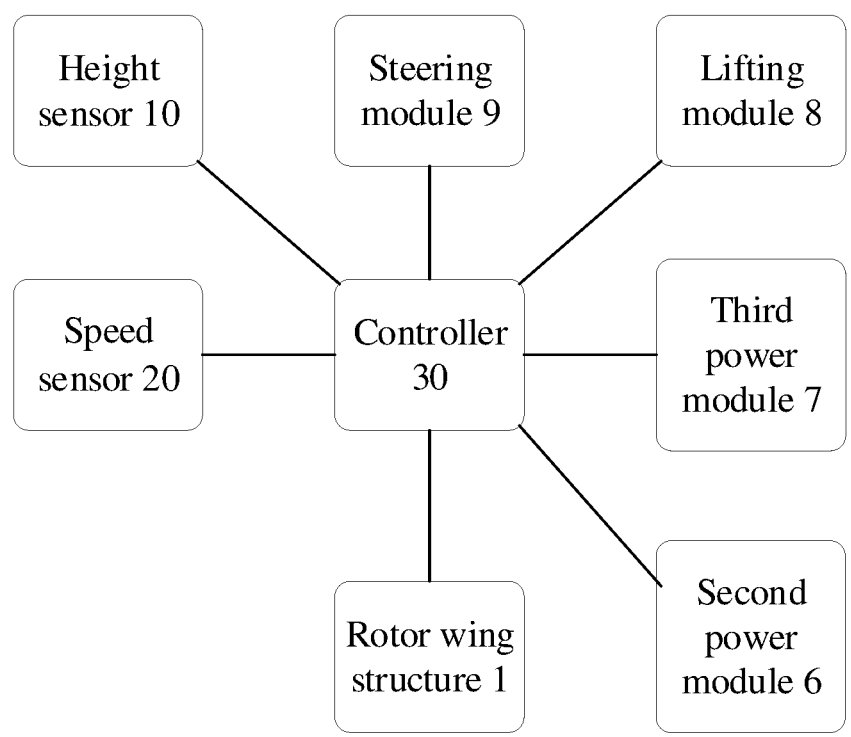
FIG. 3 is a schematic diagram of the connecting relationship of a controller in an embodiment of the present disclosure.

Please refer to FIGS. 1, 2, and 3. The unmanned aerial vehicle (UAV) 100 includes two rotor wing structures 1, a fuselage 2, two wings 3, two supporting arms 4, a tail wing 5, two second power modules 6, two third power modules 7, a lifting module 8, two steering modules 9, an altitude sensor 10, a speed sensor 20, and a controller 40. The two wings 3 are fixed to two sides of the fuselage 2, respectively, and the tail wing 5 is mounted at the tail of the fuselage 2. One supporting arm 4 is fixed to one wing 3, one rotor wing structure 1 is mounted to one end of the supporting arm 4, and the second power module 6 is fixed to the other end of the supporting arm 4. The two third power modules 7 are fixed to the head and tail of the fuselage 2, respectively. The two rotor wing structures 1, the two second power modules 6 and the two third power modules 7 are all used to power the UAV 100. The lifting module 8 is arranged at the tail wing 5, and the lifting module 8 is configured to control the climbing or descending of the UAV 100. One steering module 9 for controlling the steering of the UAV 100 is arranged on one wing 3. The altitude sensor 10 is arranged at the wing 3, and the altitude sensor 10 is configured to acquire the current altitude of the UAV 100. The speed sensor 20 is arranged at the wing 3, the speed sensor 20 being used to acquire the current speed of the UAV 100. The controller 40 is respectively connected to the rotor wing structure 1, the second power module 6, the third power module 7, the lifting module 8, the steering module 9, the altitude sensor 10, and the speed sensor 20. The controller 40 is configured to control the rotor wing structure 1, the second power module 6, the third power module 7, the lifting module 8, the steering module 9, the altitude sensor 10, and the speed sensor 20 according to a flight control command.

It needs to be noted that the rotor wing structure 1 can switch between providing power to the UAV 100 in the first direction Y and providing power to the UAV 100 in the second direction X, while the second power module 6 and the third power module 7 can only provide power to the UAV 100 in the first direction, with the first direction and second direction being perpendicular.

With respect to the rotor wing structure 1 described above, reference is made to FIGS. 4 and 5. The rotor wing structure 1 comprises a frame body 11, a mounting base 12, a first power module 14, a driving module 13, a rotating shaft 15, and a cover body 17. The frame body 11 is fixed to one end of the supporting arm 4, the rotating shaft 15 is rotatably arranged on the frame body 11, two ends of the rotating shaft 15 protrude from the frame body 11, and the mounting base 12 is fixed to the rotating shaft 15. The first power module 14 is fixed to the other end of the mounting base 12, the driving module 13 is fixed to the frame body 11, and the driving module 13 is also connected to the rotating shaft 15; the driving module 13 is configured to drive the rotating shaft 15 to rotate; the rotating shaft 15 drives the mounting base 12 to rotate relative to the frame body 11, thereby driving the first power module 14 to rotate; the cover body 17 is provided on the frame body 11 for covering some components of the driving module 13.

Figure 4:
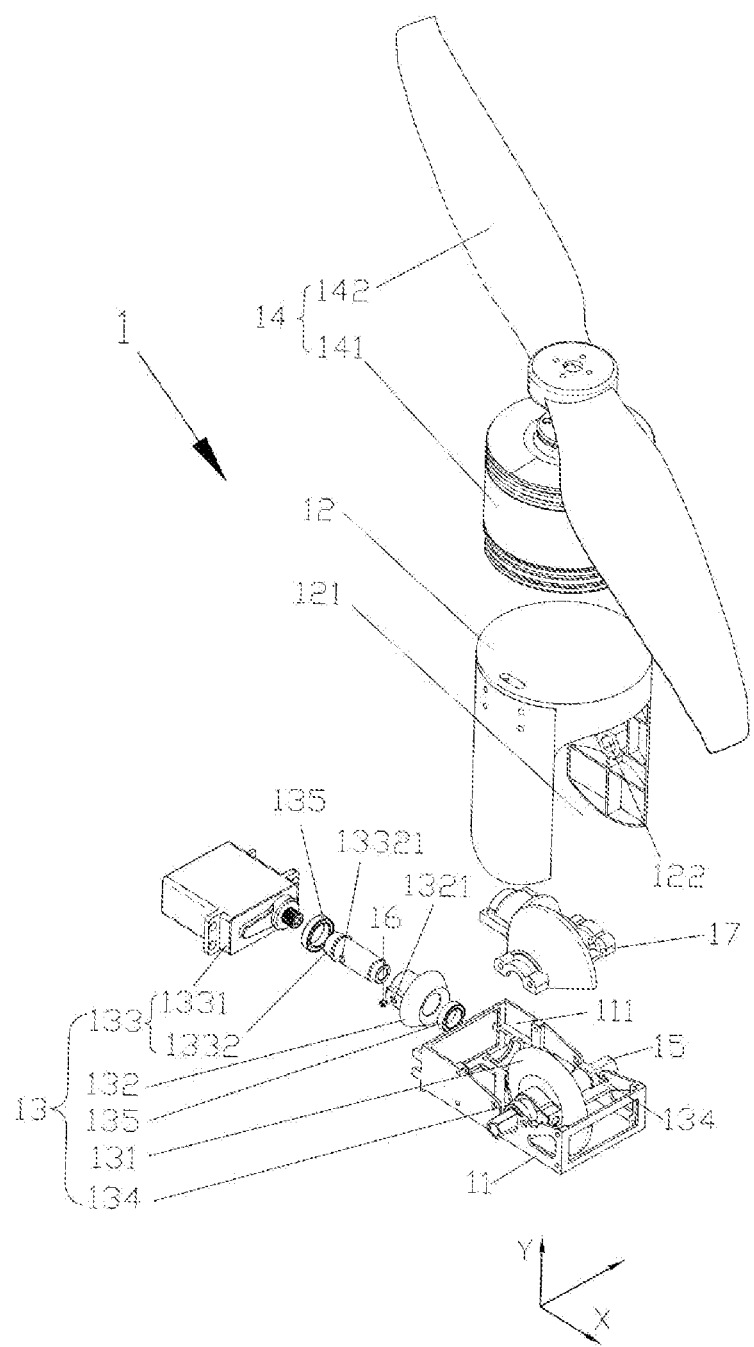
FIG. 4 is a schematic explosive diagram of a rotor wing structure in an embodiment of the present disclosure.
Figure 7:
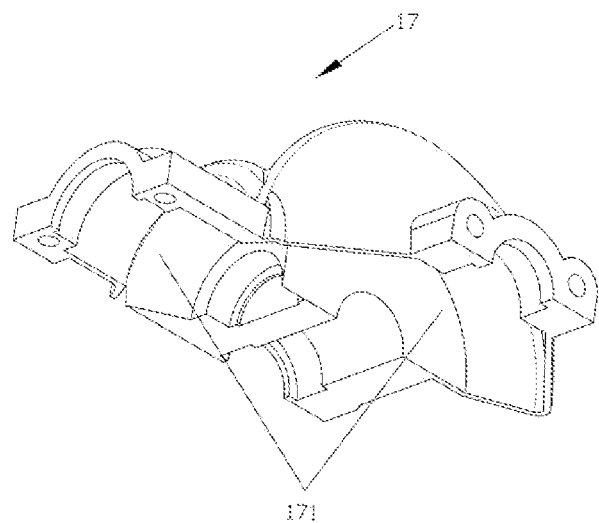
FIG. 7 is a schematic structural diagram of a cover body in an embodiment of the present disclosure.

With regard to the above-mentioned frame body 11 and cover body 17, referring to FIGS. 4 and 7, the cover body 17 is provided with a first accommodating groove 171, the frame body 11 is provided with a second accommodating groove 111, and the cover body 17 is mounted to the frame body 11 so that the first accommodating groove 171 and the second accommodating groove 111 together constitute an accommodating cavity (not shown) for accommodating a part of the piece of the driving module 13.

Figure 5:
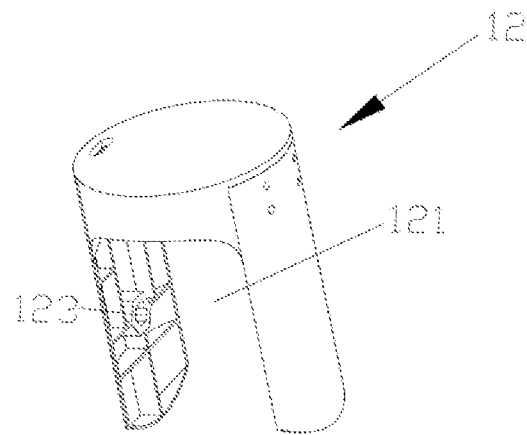
FIG. 5 is a schematic structural diagram of a mounting base in an embodiment of the present disclosure.

Referring to FIGS. 4 and 5, the mounting base 12 is provided with a groove 121, a first mounting hole 122, and a second mounting hole 123. The groove 121 is located at one end of the mounting base 12, the first mounting hole 122 is located on the first side wall of the groove 121, the second mounting hole 123 is located on the second side wall of the groove 121, the first side wall and the second side wall are opposite to each other, the frame body 11 part and the cover body 17 are both accommodated in the groove 121, one end of the rotating shaft 15 is fixed to the first mounting hole 122, and the other end of the rotating shaft 15 passes through the accommodating cavity and then is fixed to the second mounting hole 123.

With respect to the driving module 13 described above, reference is made to FIGS. 2 and 4. The driving module 13 includes a helical gear 131, a bevel gear 132, and a driving assembly 133. The helical gear 131 is located in the accommodating cavity, and the helical gear 131 is fixed to the rotating shaft 15; the driving assembly 133 is mounted to the frame body 11; the bevel gear 132 is mounted to the driving assembly 133; the bevel gear 132 meshes with the helical gear 131; the driving assembly 133 drives the bevel gear 132 to rotate; the bevel gear 132 drives the helical gear 131 to rotate; the helical gear 131 drives the rotating shaft 15 to rotate, thereby driving the mounting base 12 and the first power module 14 mounted to the mounting base 12 to rotate relative to the frame body 11 so that the first power module 14 switches between a first preset position and a second preset position; when the first power module 14 is in the first preset position relative to the frame body 11, that is: the first power module 14 is in a parallel mode, the first power module 14 can provide power to the frame body 11 in the first direction Y so that the UAV 100 can fly forward; when the first power module 14 is in a second preset position relative to the frame body 11, that is: the first power module 14 is in a lifting mode, the first power module 14 can provide power in the second direction X for the frame body 11, and in combination with the second power module and the second power module and two third power modules, the UAV 100 can vertically ascend or vertically land.

In some embodiments, referring to FIG. 4, the driving module 13 further includes two first bearings 134. The inner rings of the two first bearings 134 are respectively mounted at two ends of the rotating shaft 15, and the outer rings of the two first bearings 134 are respectively provided at two sides of the frame body 11 so that the rotating shaft 15 can rotate relative to the frame body 11.

Figure 6:
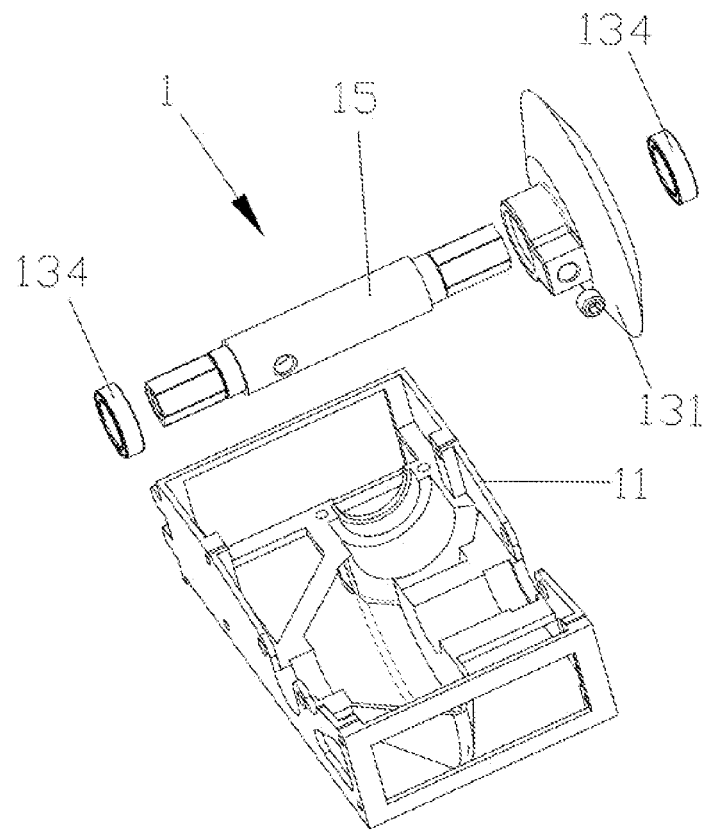
FIG. 6 is a schematic structural diagram of a frame body, rotating shaft, helical gear, and first bearing in an embodiment of the present disclosure.

With regard to the above-mentioned driving assembly 133, referring to FIGS. 4 and 6, the driving assembly 133 comprises a driving motor 1331 and a transmission shaft 1332. The driving motor 1331 is fixed to the frame body 11, the transmission shaft 1332 is rotatably arranged on the frame body 11, the transmission shaft 1332 is provided with a threaded hole 13321, the bevel gear 132 is provided with a through-hole 1321, and the rotor wing structure 1 further comprises a threaded piece 16. The threaded piece 16 passes through the through-hole 1321 and is then threadedly connected to the threaded hole 13321 so as to fix the bevel gear 132 and the transmission shaft 1332. In some embodiments, one end of the transmission shaft 1332 is provided with an inner tooth, and the output shaft of the driving motor 1331 is provided with an outer tooth. The inner tooth and the outer tooth mesh so that the driving motor 1331 can drive the transmission shaft 1332 to rotate, the transmission shaft 1332 drives the bevel gear 132 to rotate, the bevel gear 132 drives the helical gear 131 to rotate, and the helical gear 131 drives the rotating shaft 15 to rotate, thereby driving the mounting base 12 fixed to the rotating shaft 15 and the first power module 14 mounted to the mounting base 12 to rotate relative to the frame body 11.

In some embodiments, referring to FIGS. 4 and 6, the driving module 13 further includes two second bearings 135. The inner rings of the two second bearings 135 are fixed to two ends of the transmission shaft 1332, respectively, and the outer rings of the two second bearings are provided on the frame body 11 so that the transmission shaft 1332 can rotate with respect to the frame body 11. In addition, parts of the transmission shaft 1332, the helical gear 131, the bevel gear 132, the two first bearings 134, the two second bearings 135, and the rotating shaft 15 are all accommodated in the accommodating cavity, so as to prevent contaminants such as external dust from contaminating the transmission shaft 1332, the helical gear 131, the bevel gear 132, the two first bearings 134, the two second bearings 135, and the rotating shaft 15.

With regard to the above-mentioned first power module 14, referring to FIGS. 2 and 4, the first power module 14 comprises a first motor 141 and a first propeller 14. The first motor 141 is fixed to the mounting base 12, and the first propeller 142 is fixed to an output shaft of the first motor 141. When the first motor 141 is started, the first motor 141 drives the first propeller 142 to rotate, and at this time, the first power module 14 provides the frame body 11 with power parallel to the axis of the output shaft of the first motor 141. When the first power module 14 is in a first preset position with respect to the frame body 11, the axis of the output shaft of the first motor 141 is perpendicular to the axis of the fuselage 2. At this time, the first power module 14 can provide power to the UAV 100 in the first direction Y perpendicular to the length direction of the supporting arm 4. When the first power module 14 is in a second preset position with respect to the frame body 11, the axis of the output shaft of the first motor 141 is parallel to the axis of the fuselage 2. At this time, the first power module 14 can provide power to the UAV 100 in the second direction X, which is parallel to the length direction of the supporting arm 4.

With regard to the above-mentioned second power module 6, referring to FIG. 2, the second power module 6 comprises a second motor 61 and a second propeller 62. The second motor 61 is fixed to the other end of the supporting arm 4, and the second propeller 62 is fixed to the output shaft of the second motor 61. The axis of the output shaft of the second motor 61 is parallel to the first direction Y, and the second motor 61 is configured to drive the second propeller 62 to rotate so as to provide power in the first direction Y to the UAV 100.

With regard to the above-mentioned third power module 7, with reference to FIG. 2, the third power module 7 comprises a third motor 71 fixed to the fuselage 2 and a third propeller 72 fixed to the output shaft of the third motor 71. The axis of the output shaft of the third motor 71 and the axis of the output shaft of the second motor 61 are parallel, and the third motor 71 is configured to drive the third propeller 72 to rotate so as to provide power in the first direction Y to the UAV 100.

Figure 8:
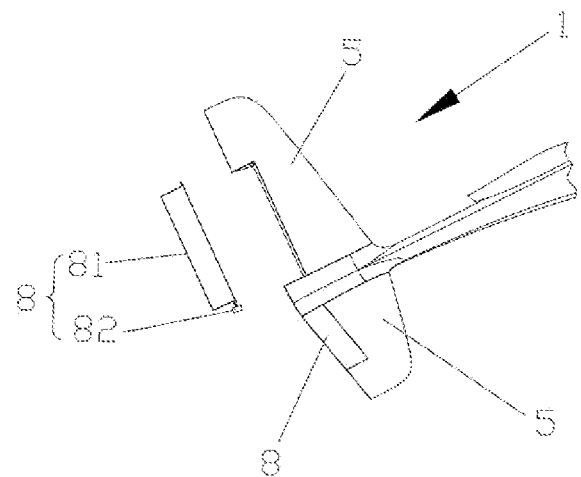
FIG. 8 is a schematic structural diagram of a lifting module in an embodiment of the present disclosure.

With regard to the above-mentioned lifting module 8, referring to FIGS. 2 and 8, the lifting module 8 comprises an elevator 81 and a first steering engine 82. The elevator 81 is rotatably arranged on the tail wing 5, the first steering engine 82 is connected to the elevator 81, and the first steering engine 82 is configured to drive the elevator 81 to deflect upwards, downwards relative to the tail wing 5, or making the elevator 81 coplanar with the tail wing 5. When the UAV 100 is in flight, the negative lift is generated at the tail of the UAV 100 by controlling the elevator 81 to deflect upwards relative to the tail wing 5, so that the UAV 100 generates a head-raising moment. At that, the tail of the UAV 100 deflects downwards relative to the head of the UAV 100, allowing the UAV 100 to climb upwards. By controlling the downward deflection of the elevator 81 with respect to the tail wing 5, a positive lift is generated at the tail of the UAV 100, such that a head-down moment is generated by the UAV 100. Therefore, the tail of the UAV 100 is deflected upward with respect to the head of the UAV 100, causing the UAV 100 to bend and descend.

With regard to the steering module 9 described above, with reference to FIGS. 2 and 9, the steering module 9 comprises an aileron 91 which is rotatably arranged on the wing 3, and a second steering engine 92 which is mounted to the wing 3. The second steering engine 92 is also connected to the aileron 91, the second steering engine 92 being configured to drive the aileron 91 to deflect upwards or downwards with respect to the wing 3, or make the aileron 91 coplanar with the wing 3. When the UAV 100 is in flight, by controlling the aileron 91 on the left side of the forward direction of the UAV 100 to deflect upwards relative to the wing 3 on the left side, the lift force of the wing 3 on the left side of the forward direction of UAV 100 is reduced, or by controlling the aileron 91 on the right side of the forward direction of UAV 100 to deflect downwards relative to the wing 3 on the right side, the lift force of the wing 3 on the right side in the forward direction of the UAV 100 is increased. The lift force of the wing 3 on the right side of the forward direction of the UAV 100 is greater than that of the wing 3 on the left side so as to enable the UAV 100 to generate a moment tilting to the left side of the forward direction, thereby causing the UAV 100 to tilt to the left of the forward direction so as to achieve the purpose of turning UAV 100 left. By controlling the aileron 91 on the left side of the forward direction of the UAV 100 to deflect downwards relative to the wing 3 on the left side, the lift force of the wing 3 on the left side of the forward direction of the UAV 100 is increased. Alternatively, by controlling the aileron 91 on the right side of the forward direction of the UAV 100 to deflect upwards relative to the wing 3 on the right side, the lift force of the wing 3 on the right side in the forward direction of the UAV 100 is reduced. The lift force of the wing 3 on the right side in the forward direction of the UAV 100 is less than that of the wing 3 on the left side of the forward direction of the UAV 100 so as to enable the UAV 100 to generate a moment tilting to the right side of the forward direction, thereby causing the UAV 100 to tilt to the right side of the forward direction so as to achieve the purpose of turning UAV 100 right.

In an embodiment of the present disclosure, the driving module 13 may drive the first power module 14 to rotate relative to the supporting arm 4 such that the first power module 14 may switch between a level flight mode and a lifting mode. Therefore, the first power module 14 may provide the power of two directions of level flight power or lifting power.

Figure 10:
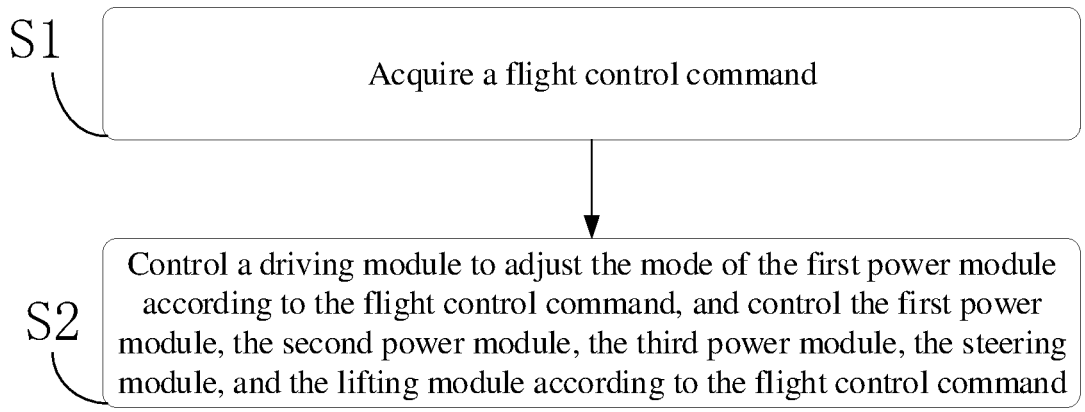
FIG. 10 is a flowchart of a method for controlling the flight of an UAV in an embodiment of the present disclosure.

An embodiment of the present disclosure also provides a method for controlling the flight of the UAV as described above. Referring to FIG. 10, the method for controlling the flight of the UAV includes:

step S1: acquiring a flight control command;
wherein the flight control command is a command for controlling the UAV 100, for example: a command to control the UAV 100 to ascend vertically, a command to control the UAV to land vertically, a command to control the UAV 100 to climb, etc.; the fight control command may be sent by a remote control for controlling the UAV 100 or may be generated according to a flight requirement, such as the following scenario where the flight requirement is to fly from place A to place B, and the flight process of the UAV 100 includes: first ascending vertically, level flight after reaching a preset altitude, stopping level flight after reaching place B, then landing vertically, and finally, turning off the power; therefore, the flight requirement comprises a vertical ascending command, a forward flight command, and a vertical landing command;

and step S2: according to the flight control command, controlling the driving module 13 to adjust the mode of the first power module 14 and controlling the first power module 14, the second power module 6, the third power module 7, the steering module 9, and the lifting module 8.

Figure 11:
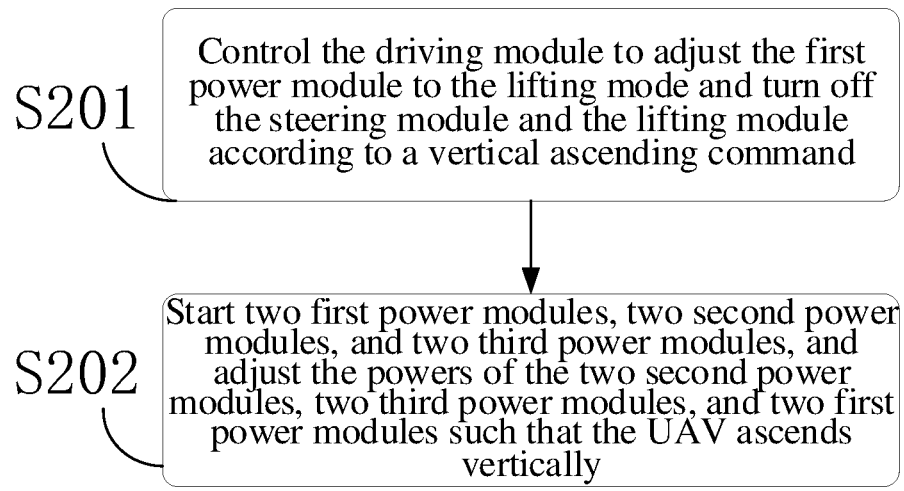
FIG. 11 is a flowchart of a method for controlling the vertical ascending of an UAV in an embodiment of the present disclosure.

In some embodiments, referring to FIG. 11, the flight control command includes a vertical ascending command, and step S2 further includes:

step S201: controlling the driving module 13 to adjust the first power module 14 to a lifting mode and turning off the steering module 9 and the lifting module 8 according to the vertical ascending command; and step S202: starting two first power modules 14, two second power modules 6, and the two third power modules 7, and adjusting the powers of two second power modules 6, two third power modules 7, and two first power modules 14 so that the UAV 100 ascends vertically.

After the first power module 14 is adjusted to the lifting mode, the powers of two second power modules 6, two third power modules 7, and two first power modules 14 all provide power for vertical lifting, and by controlling the moments of the powers of two second power modules 6, two third power modules 7, and the two first power modules 14, the UAV 100 can be controlled to ascend vertically.

It needs to be noted that under the lifting mode of the first power module 14, the aileron 91 of the steering module 9 is coplanar with the wing 3, and the elevator 81 of the lifting module 8 is coplanar with the tail wing 5; as it is in a horizontal state, it is advantageous for reducing the influence of the steering module 9 and the lifting module 8 on the vertical ascending of the UAV 100.

Figure 12:
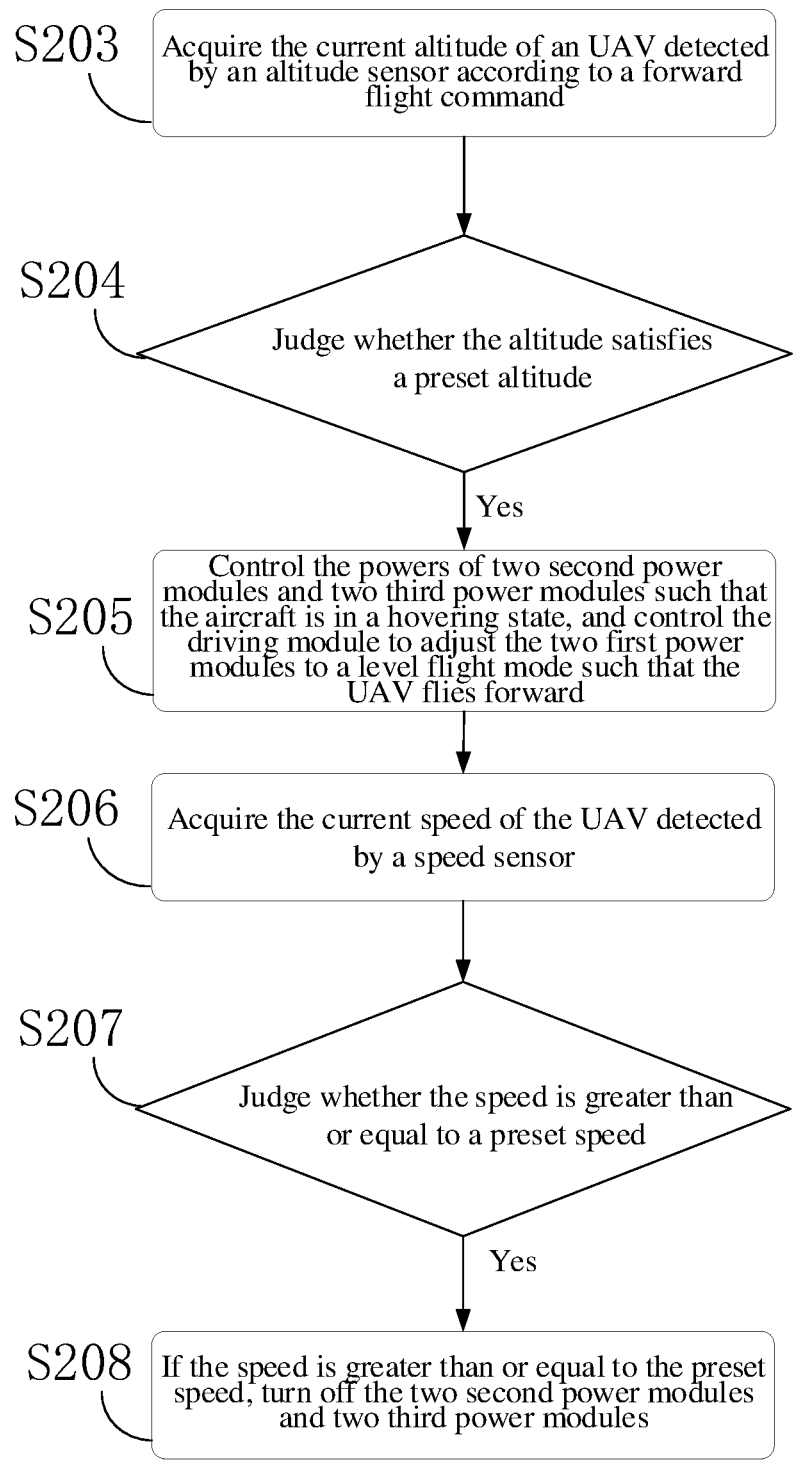
FIG. 12 is a flowchart of a method for controlling the forward flight of an UAV in an embodiment of the present disclosure.

In some embodiments, referring to FIG. 12, the flight control command further includes a forward flight command. Step S2 further includes:

step S203: acquiring the current altitude of the UAV 100 detected by an altitude sensor 10 according to the forward flight command;

step S204: judging whether the altitude satisfies a preset altitude;

wherein the numerical value of the preset altitude is not limited and can be set according to actual conditions, for example: the preset altitude being 10 meters, 50 meters, etc.;

and step S205: if the altitude satisfies the preset altitude, controlling the powers of two second power modules 6 and two third power modules 7 so that the UAV 100 is in a hovering state, and controlling the driving module 13 to adjust two first power modules 14 into a level flight mode so that the UAV 100 flies forward.

The first power module 14 is under the level flight mode, the first power module 14 is in a second preset position, and the first power module 14 can provide power for the UAV 100 in a second direction X.

After the UAV 100 reaches a predetermined altitude, let the UAV 100 hover first, then adjust the mode of the first power module 14. It can avoid technical issues of causing upward pulling force on the UAV 100, causing the UAV 100 to tilt when flying upwards, and causing bad control of the posture of the UAV 100 when the mode of the first power module 14 is adjusted during the ascending process of the UAV 100.

In some embodiments, please refer to FIG. 12, step S2 also includes:

step S206: acquiring the current speed of the UAV 100 detected by a speed sensor 20;

step S207: judging whether the speed is greater than or equal to a preset speed; and step S208: if the speed is greater than or equal to the preset speed, turning off two second power modules 6 and two third power modules 7.

When the speed is greater than or equal to the preset speed, the UAV 100 provides sufficient lift force through the two wings 3 to overcome the gravity of the UAV 100. Therefore, the second power module 6 and the third power module 7 are not required to provide the lift force. At this time, turning off the second power module 6 and the third power module 7 can save electrical energy.

In some embodiments, referring to FIG. 13, the flight control command further comprises a climbing command. Step S2 further includes:

S209: according to the climbing command, controlling the lifting module 8 to deflect upwards and controlling two first power modules 14 to accelerate.

By deflecting the lifting module 8 upwards, a negative lift is generated at the tail of the UAV 100, so that the UAV 100 generates a head-raising moment. Therefore, the tail of the UAV 100 is deflected downwards relative to the head so as to achieve the purpose of the UAV 100 climbing upwards. While two first power modules 14 are controlled to accelerate so as to enable the UAV 100 to maintain the original speed for climbing upwards.

In some embodiments, referring to FIG. 14, the flight control command includes a descending command. Step S2 further includes:

S210: according to the descending command, controlling the lifting module 8 to deflect downwards and controlling two first power modules 14 to decelerate.

By controlling the lifting module 8 to deflect downwards, a positive lift is generated at the tail of the UAV 100, such that the UAV 100 generates a head-down moment. Therefore, the tail of the UAV 100 is deflected upward relative to the head so as to achieve the purpose of the UAV 100 bending and descending. While two first power modules 14 are controlled to decelerate so as to enable the UAV 100 to maintain the original speed for descending.

In some embodiments, referring to FIG. 15, the flight control command includes a steering command. Step S2 further includes:

step S211: according to the steering command, deflecting the steering module 9 corresponding to the steering command upwards, deflecting the other steering module 9 downwards, and controlling two first power modules 14 to accelerate.

For example: when the UAV 100 needs to turn left, deflecting the steering module 9 on the left side of the UAV 100 upwards and deflecting the steering module 9 on the right side of the UAV 100 downwards can reduce the lift force of the wing 3 on the left side of the UAV 100, and at the same time increase the lift force of the wing 3 on the right side of the UAV 100 such that the lift force of the wing 3 on the right side of the forward direction of the UAV 100 is greater than the lift force of the wing 3 on the left side of the forward direction of the UAV 100; therefore, the UAV 100 is caused to generate a moment inclined to the left side of the flight direction, and thus the UAV 100 is inclined to the left so that the UAV 100 achieves the purpose of turning left. Another example is as follows: when the UAV 100 needs to turn right, deflecting the steering module 9 on the right side of the UAV 100 upwards and deflecting the steering module 9 on the left side of the UAV 100 downwards can enable the lift force of the wing 3 on the right side of the UAV 100 to be reduced while the lift force of the wing 3 on the left side of the UAV 100 to be increased; therefore, the lift force of the wing 3 on the right side of the forward direction of the UAV 100 is less than the lift force of the wing 3 on the left side of the forward direction of the UAV 100; so the UAV 100 is caused to generate a moment inclined to the right side of the flight direction, thereby enabling the UAV 100 to be inclined to the right, and enabling the UAV 100 to achieve the purpose of turning right. When the UAV 100 is turning, controlling two first power modules 14 to accelerate can cause the UAV 100 to maintain its original speed and turn.

Figure 16:
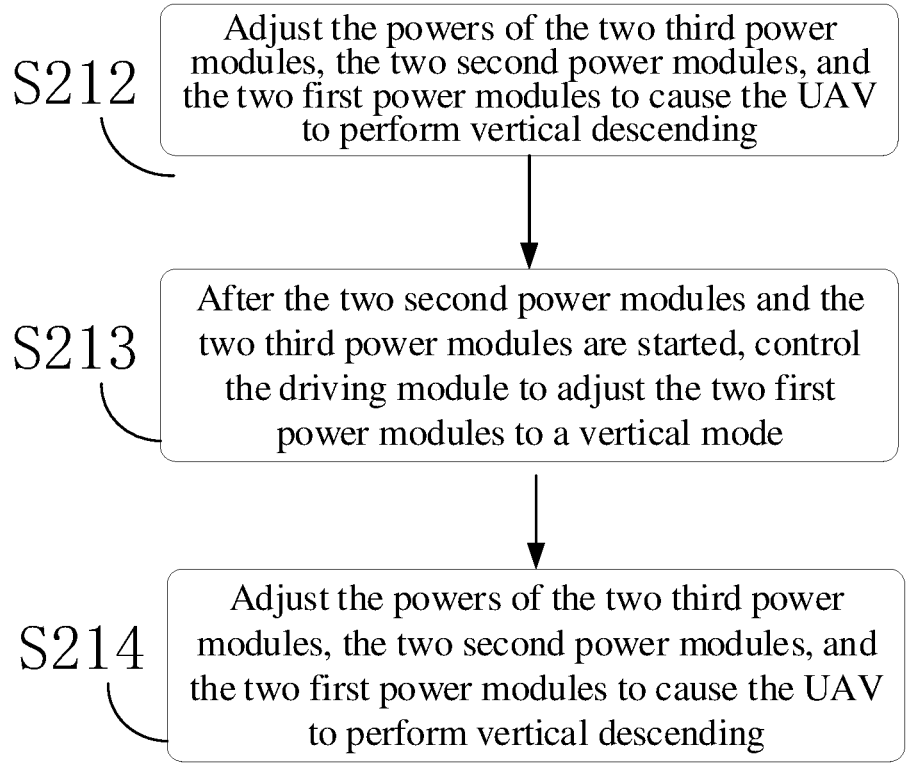
FIG. 16 is a flowchart of a method for controlling the vertical landing of an UAV in an embodiment of the present disclosure.

In some embodiments, referring to FIG. 16, the flight control command includes a vertical landing command. Step S2 further includes:

step S212: starting the two second power modules 6 and the two third power modules 7 according to the vertical landing command;

step S213: after the two second power modules 6 and the two third power modules 7 are started, controlling the driving module 13 to adjust the two first power modules 14 to a vertical mode; and step S214: adjusting the powers of the two third power modules 7, the two second power modules 6, and the two first power modules 14 to cause the UAV 100 to perform a vertical landing.

In an embodiment of the present disclosure, the first power module 14 is driven to rotate relative to the supporting arm 4 by the driving module 13, and at the same time, by controlling the driving module 13, the first power module 14 is caused to be in the level flight mode or lifting mode, and by controlling the first power module 14, the second power module 6, the third power module 7, the steering module 9, and the lifting module 8, the flight mission of the UAV 100 is achieved. Therefore, the UAV 100 does not need to be specifically equipped with a power module that can only make a drone level flight, which is beneficial for reducing the number of power modules of the UAV 100, thereby reducing the weight of the UAV 100.

Figure 17:
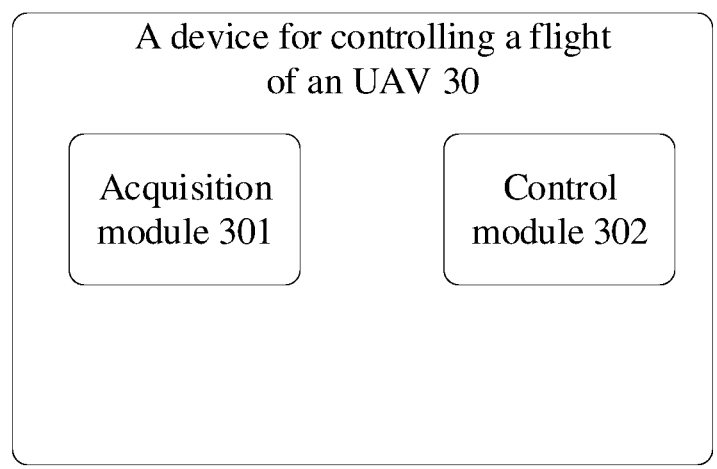
FIG. 17 is a schematic structural diagram of a device for controlling the flight of an UAV in an embodiment of the present disclosure.

The disclosure further provides an embodiment of a device for controlling the flight of an UAV 100. The device 30 includes an acquisition module 301 and a control module 302, as shown in FIG. 17.

The acquisition module 301 is configured to acquire a flight control command. The control module 302 is configured to control the driving module 13 to adjust the mode of the first power module 14 according to the flight control command, and control the first power module 14, the second power module 6, the third power module 7, the steering module 9, and the lifting module 8.

The flight control command includes a vertical ascending command. The control module 302 is specifically configured to control the driving module 13 to adjust the first power module 14 to a lifting mode and turning off the steering module 9 and the lifting module 8 according to the vertical ascending command; and start two first power modules 14, two second power modules 6, and two third power modules 7, and adjust the powers of the two second power modules 6, two third power modules 7, and two first power modules 14 to cause the UAV 100 to vertically ascend.

The flight control command includes a forward flight command. The control module 302 is specifically configured to: according to the forward flight command, acquire the current altitude of the UAV 100 detected by the altitude sensor 10, and determine whether the altitude satisfies a preset altitude; and if the altitude satisfies the preset altitude, control the powers of two second power modules 6 and two third power modules 7 so that the UAV 100 is in a hovering state, and control the driving module 13 to adjust two first power modules 14 into a level flight mode so that the UAV 100 flies forward. During the forward flight of the UAV 100, the current speed of the UAV 100 detected by the speed sensor 20 is acquired, and it is determined whether the speed is greater than or equal to a preset speed; if the speed is greater than or equal to the preset speed, two second power modules 6 and two third power modules 7 are turned off.

The flight control command includes a climbing command. The control module 302 is specifically configured to, according to the climbing command, control the lifting module 8 to deflect upwards and control two first power modules 14 accelerate.

The flight control command includes a descending command. The control module 302 is specifically configured to, according to the descending command, control the lifting module 8 to deflect downwards and control two first power modules 14 to decelerate.

The flight control command includes a steering command. The control module 302 is specifically configured to according to the steering command, deflect the steering module 9 corresponding to the steering command upwards, deflect the other steering module 9 downwards, and control two first power modules 14 to accelerate.

The flight control command includes a vertical landing command. The control module 302 is specifically configured to: start the two second power modules 6 and the two third power modules 7 according to the vertical landing command; after the two second power modules 6 and the two third power modules 7 are started, control the driving module 13 to adjust the two first power modules 14 into a vertical mode; and adjust the powers of the two third power modules 7, the two second power modules 6, and the two first power modules 14 to cause the UAV 100 to perform the vertical landing.

In an embodiment of the present disclosure, the first power module 14 is driven to rotate relative to the supporting arm 4 by the driving module 13 so that the first power module 14 can be switched between the level flight mode and the lifting mode, and the first power module 14 can provide power in two directions of level flight power or lifting power; when it is necessary to execute the flight, the first power module 14, the second power module 6, the third power module 7, the steering module 9, and the lifting module 8 are controlled according to the flight control command to achieve the flight of the UAV 100.

Figure 9:
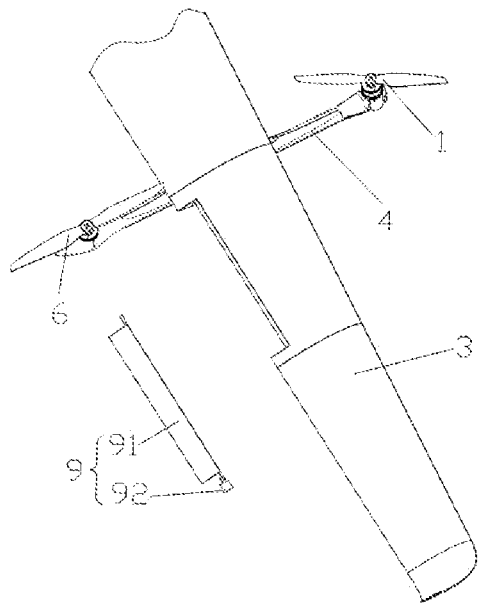
FIG. 9 is a schematic structural diagram of a steering module in an embodiment of the present disclosure.
Figure 18:
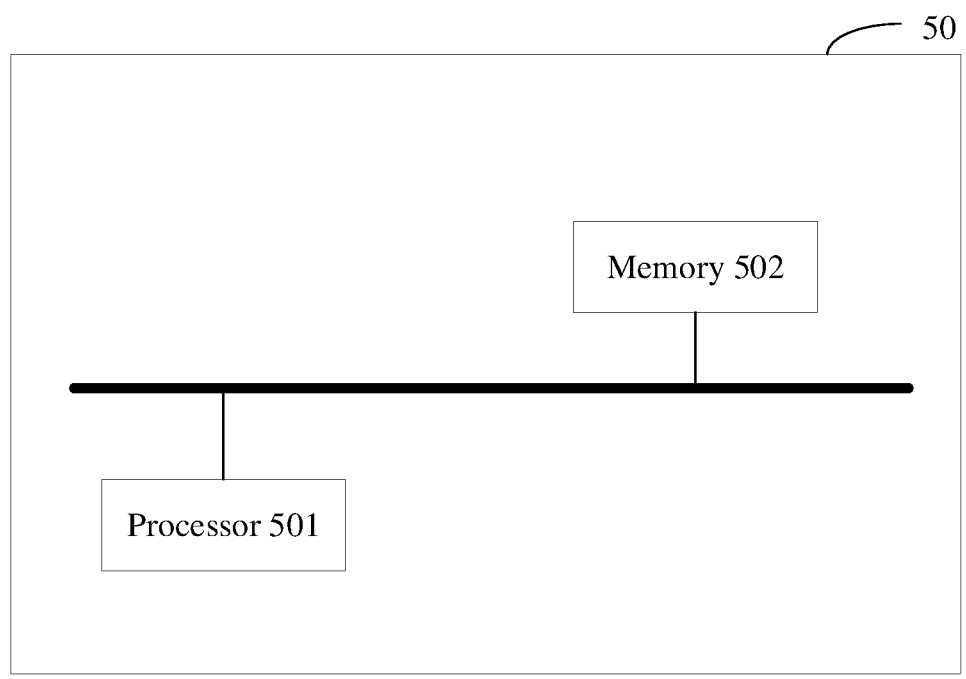
FIG. 18 is a schematic structural diagram of a controller in an embodiment of the present disclosure.

The present disclosure also provides an embodiment of a controller for an UAV. Referring to FIG. 18, there is shown a schematic structural diagram of a controller of the UAV according to an embodiment of the present disclosure. The controller 50 includes: at least one processor 501; and, a memory 502 communicatively connected to the at least one processor 501. FIG. 9 takes one of the processors 501 as an example. The memory 502 stores an instruction executable by the at least one processor 501. The instruction is executed by at least one processor 501 to enable the at least one processor 501 to execute the method for controlling the flight of an UAV 100 as described in FIGS. 10 to 16, and to execute the device for controlling the flight of an UAV 100 as described in FIG. 17. The processor 501 and the memory 502 may be connected by a bus or other ways. FIG. 18 takes a bus connection as an example.

The memory 502, as a non-volatile computer storage medium, can be used to store non-volatile software programs, and non-volatile computer-executable program and module, such as a program instruction/module corresponding to a method for controlling the flight of an UAV 100 in an embodiment of the present application, such as various modules shown in FIG. 18. The processor 501 executes various functional applications and data processing of a server by running non-volatile software program, instruction, and module stored in the memory 502, achieving the above method for controlling the flight of an UAV 100.

The memory 502 may include a program storage area and a data storage area, wherein the program storage area may store an application program required by an operating system and at least one function; the data storage area may store data and the like created according to the use of the device for controlling the flight of an UAV 100. In addition, the memory 502 may include high-speed random access memory 502, as well as non-volatile memory 502, such as at least one disk memory 502 piece, flash memory device, or other non-volatile solid-state memory 502 pieces. In some embodiments, the memory 502 may optionally include a memory 502 remotely provided relative to the processor 501. These remote memories 502 can be connected to a device for controlling the flight of an UAV 100 through a network. Examples of such networks include, but are not limited to, the Internet, Intranets, local area networks, mobile communication networks, and combinations thereof.

One or more modules are stored in the memory 502, and when the same is executed by one or more processors 501, a method for controlling the flight of an UAV 100 in any of the above method embodiments is executed, such as executing the method steps described in FIGS. 10 to 16, and executing the device for controlling the flight of an UAV 100 in FIG. 17.

The above descriptions are only embodiments of the present disclosure, and do not thus limit the scope of the patent of the present disclosure. Any equivalent structure or equivalent flow transformation made by using the content of the description and accompanying drawings of the present disclosure, or directly or indirectly applied in other related technical fields, is equally included in the scope of patent protection of the present disclosure.

The invention claimed is:

1. A method for controlling a flight of an unmanned aerial vehicle (UAV), the UAV comprising a fuselage, two wings, two supporting arms, two rotor wing structures, two second power modules, two third power modules, two steering modules, a lifting module, an altitude sensor, and a speed sensor, wherein:
  the two wings are respectively fixed to two sides of the fuselage, one of the supporting arms is fixed to one of the wings;
  the rotor wing structure comprises a first power module and a driving module connected to the first power module, the driving module of one of the rotor wing structures is fixed to one end of one of the supporting arms, and the driving module is configured to drive the first power module to rotate relative to the supporting arm, so that the first power module is switchable between a level flight mode and a lifting mode;
  one second power module is fixed to the other end of one supporting arm, the two third power modules are respectively fixed to a head and a tail of the fuselage, one steering module is respectively provided on one wing, and the lifting module is provided on the tail of the fuselage; and
  the altitude sensor is provided on the fuselage or the wing, and the speed sensor is provided on the fuselage or the wing; and
  wherein the method comprises steps of:
  acquiring a flight control command; and according to the flight control command, controlling the driving module to adjust a mode of the first power module and controlling the first power module, the second power module, the third power module, the steering module, and the lifting module;

wherein the flight control command comprises a steering command; and the step of according to the flight control command, controlling the driving module to adjust the mode of the first power module and controlling the first power module, the second power module, the third power module, the steering module, and the lifting module, comprises:

according to the steering command, deflecting one of the steering modules corresponding to the steering command upwards, deflecting the other steering module downwards, and controlling the two first power modules to accelerate.

2. The method according to claim 1, wherein:

the flight control command comprises a vertical ascending command;

the step of controlling the driving module to adjust the mode of the first power module and controlling the first power module, the second power module, the third power module, the steering module, and the lifting module, comprises:

controlling the driving module to adjust the first power module to the lifting mode and turning off the steering module and the lifting module according to the vertical ascending command; and starting the two first power modules, two second power modules, and two third power modules, and adjusting powers of the two second power modules, two third power modules, and two first power modules to cause the UAV to vertically ascend.

3. The method according to claim 1, wherein:

the flight control command comprises a forward flight command;

the step of controlling the driving module to adjust the mode of the first power module and controlling the first power module, the second power module, the third power module, the steering module, and the lifting module, comprises:

acquiring a current altitude of the UAV detected by the altitude sensor according to the forward flight command;

judging whether an altitude satisfies a preset altitude; and if the altitude satisfies the preset altitude, controlling powers of the two second power modules and two third power modules so that the UAV is in a hovering state, and controlling the driving module to adjust the two first power modules into a level flight mode so that the UAV flies forward.

4. The method according to claim 1, wherein:

the flight control command comprises a climbing command; and the step of controlling the driving module to adjust the mode of the first power module and controlling the first power module, the second power module, the third power module, the steering module, and the lifting module, comprises:

according to the climbing command, controlling the lifting module to deflect upwards and controlling the two first power modules to accelerate.

5. The method according to claim 1, wherein:

the flight control command comprises a descending command; and the step of according to the flight control command, controlling the driving module to adjust the mode of the first power module and controlling the first power module, the second power module, the third power module, the steering module, and the lifting module, comprises:

according to the descending command, controlling the lifting module to deflect downwards and controlling the two first power modules to decelerate.

6. The method according to claim 1, wherein:

the flight control command comprises a vertical landing command; and the step of according to the flight control command, controlling the driving module to adjust the mode of the first power module and controlling the first power module, the second power module, the third power module, the steering module, and the lifting module, comprises:

starting the two second power modules and two third power modules according to the vertical landing command;

after the two second power modules and the two third power modules are started, controlling the driving module to adjust the two first power modules to a vertical mode; and adjusting powers of the two third power modules, the two second power modules, and the two first power modules to cause the UAV to perform a vertical landing.

7. The method according to claim 1, wherein each rotor wing structure further comprises a frame body, a mounting base, a rotating shaft, and a cover body;

the frame body is fixed to one end of one of the supporting arms, the rotating shaft is rotatably arranged on the frame body, two ends of the rotating shaft protrude from the frame body, and an end of the mounting base is fixed to the rotating shaft;

the first power module is fixed to another end of the mounting base, the driving module is fixed to the frame body, and the driving module is connected to the rotating shaft;

the driving module is configured to drive the rotating shaft to rotate, so as to drive the mounting base to rotate relative to the frame body, thereby driving the first power module to rotate; and the cover body is positioned on the frame body for partially covering the driving module.

8. The method according to claim 7, wherein the mounting base defines a groove, a first mounting hole, and a second mounting hole; and the groove is located at an end of the mounting base, the first mounting hole is located on a first side wall of the groove, the second mounting hole is located on a second side wall of the groove, the first side wall and the second side wall are opposite to each other, a part of the frame body and the cover body are both accommodated in the groove, one end of the rotating shaft is fixed to the first mounting hole, and another end of the rotating shaft passes through the accommodating cavity and is fixed to the second mounting hole.

9. The method according to claim 8, wherein the driving module comprises a helical gear, a bevel gear, and a driving assembly; and the helical gear is located in the frame body, and the helical gear is fixed to the rotating shaft, the driving assembly is mounted to the frame body, the bevel gear is mounted to the driving assembly, the bevel gear meshes with the helical gear, the driving assembly is configured to drive the bevel gear to rotate, so as to drive the helical gear and the rotating shaft to rotate, thereby driving the mounting base and the first power module to rotate relative to the frame body.

10. The method according to claim 9, wherein the driving assembly comprises a driving motor and a transmission shaft;
the driving motor is fixed to the frame body, the transmission shaft is rotatably arranged on the frame body, the transmission shaft defines a threaded hole, the bevel gear defines a through-hole, the rotor wing structure further comprises a threaded piece, the threaded piece passes through the through-hole and is then threadedly connected to the threaded hole, so as to fix the bevel gear and the transmission shaft; and
one end of the transmission shaft is provided with an inner tooth, an output shaft of the driving motor is provided with an outer tooth, and the inner tooth and the outer tooth mesh, such that the driving motor is capable of driving the transmission shaft to rotate, so as to drive the bevel gear, the bevel gear and the helical gear to rotate.

11. The method according to claim 1, wherein the UAV comprises a tail wing mounted at the tail of the fuselage;
the lifting module comprises an elevator and a first steering engine, the elevator is rotatably arranged on the tail wing, the first steering engine is connected to the elevator, and the first steering engine is configured to drive the elevator to deflect upwards, downwards relative to the tail wing, or making the elevator coplanar with the tail wing; and
each steering module comprises an aileron and a second steering engine, the aileron is rotatably arranged on the wing, the second steering engine is mounted to the wing, the second steering engine is connected to the aileron, the second steering engine is configured to drive the aileron to deflect upwards or downwards with respect to the wing, or make the aileron coplanar with the wing.

12. The method according to claim 11, wherein under the lifting mode of the first power module, the aileron is coplanar with the wing, the elevator of the lifting module is coplanar with the tail wing, and the aileron and the elevator are in a horizontal state.

13. A device for controlling a flight of an unmanned aerial vehicle (UAV), the UAV comprising a fuselage, two wings, two supporting arms, two rotor wing structures, two second power modules, two third power modules, two steering modules, a lifting module, an altitude sensor, and a speed sensor, wherein:
the two wings are respectively fixed to two sides of the fuselage, one of the supporting arms is fixed to one of the wings;
the rotor wing structure comprises a first power module and a driving module connected to the first power module, the driving module of one of the rotor wing structures is fixed to one end of one of the supporting arms, and the driving module is configured to drive the first power module to rotate relative to the supporting arm, so that the first power module is switchable between a level flight mode and a lifting mode;
one second power module is fixed to the other end of one supporting arm, the two third power modules are respectively fixed to a head and a tail of the fuselage, one steering module is respectively provided on one wing, and the lifting module is provided on the tail of the fuselage; and the altitude sensor is provided on the fuselage or the wing, and the speed sensor is provided on the fuselage or the wing;
wherein the device comprises:
an acquisition module configured to acquire a flight control command; and
a control module configured to, according to the flight control command, control the driving module to adjust a mode of the first power module and control the first power module, the second power module, the third power module, the steering module, and the lifting module;
the flight control command comprises a steering command; and
the control module is further configured to:
according to the steering command, deflect one of the steering modules corresponding to the steering command upwards, deflect the other steering module downwards, and control the two first power modules to accelerate.

14. The device according to claim 13, wherein:
the flight control command comprises a forward flight command;
the control module is further configured to:
acquire a current altitude of the UAV detected by the altitude sensor according to the forward flight command;
judge whether an altitude satisfies a preset altitude; and
if the altitude satisfies a preset altitude, control powers of the two second power modules and two third power modules so that the UAV is in a hovering state, and control the driving module to adjust the two first power modules into a level flight mode so that the UAV flies forward;
acquire the current speed of the UAV detected by the speed sensor;
judge whether the speed is greater than or equal to the preset speed; and
if the speed is greater than or equal to the preset speed, turn off the two second power modules and two third power modules.

15. The device according to claim 13, wherein:
the flight control command comprises a climbing command, a descending command, and a vertical landing command; and
the control module is further configured to:
according to the climbing command, control the lifting module to deflect upwards and control the two first power modules to accelerate;
the control module is further configured to:
according to the descending command, control the lifting module to deflect downwards and control the two first power modules to decelerate; and
the control module is further configured to:
according to the vertical landing command, start the two second power modules and two third power modules;
after the two second power modules and the two third power modules are started, control the driving module to adjust the two first power modules to a vertical mode; and
adjust powers of the two third power modules, the two second power modules, and the two first power modules to cause the UAV to perform a vertical landing.

16. An unmanned aerial vehicle (UAV), comprising:
a fuselage;
two wings respectively fixed to two sides of the fuselage;

two supporting arms, one of the supporting arms being fixed to one of the wings;

two rotor wing structures, the rotor wing structure comprising a first power module and a driving module connected to the first power module, wherein the driving module of one rotor wing structure is fixed to one end of one supporting arm, and the driving module is configured to drive the first power module to rotate relative to the supporting arm, so that the first power module is switchable between a level flight mode and a lifting mode;

two second power modules, wherein one second power module is fixed to the other end of one supporting arm;

two third power modules respectively fixed to a head and a tail of the fuselage;

a lifting module provided at the tail of the fuselage;

two steering modules, wherein one steering module is provided on one wing;

an altitude sensor provided on the fuselage or the wing;

a speed sensor provided on the fuselage or the wing; and a controller comprising a memory and at least one processor, wherein the at least one processor is respectively communicatively connected to the memory, two second power modules, two third power modules, the lifting module, the altitude sensor, the speed sensor, the first power module, and the driving module;

the memory stores one or more instructions executable by the at least one processor, the instruction being executed by the at least one processor to execute a method for controlling a flight of the UAV, wherein the method comprises steps of:

acquiring a flight control command; and according to the flight control command, controlling the driving module to adjust a mode of the first power module and controlling the first power module, the second power module, the third power module, the steering module, and the lifting module;

wherein the flight control command comprises a steering command; and the step of according to the flight control command, controlling the driving module to adjust the mode of the first power module and controlling the first power module, the second power module, the third power module, the steering module, and the lifting module, comprises:

according to the steering command, deflecting one of the steering modules corresponding to the steering command upwards, deflecting the other steering module downwards, and controlling the two first power modules to accelerate.

17. The UAV according to claim 16, wherein:

the flight control command comprises a vertical ascending command;

the step of controlling the driving module to adjust the mode of the first power module and controlling the first power module, the second power module, the third power module, the steering module, and the lifting module, comprises:

controlling the driving module to adjust the first power module to the lifting mode and turning off the steering module and the lifting module according to the vertical ascending command; and starting the two first power modules, two second power modules, and two third power modules, and adjusting powers of the two second power modules, two third power modules, and two first power modules to cause the UAV to vertically ascend.

18. The UAV according to claim 16, wherein:

the flight control command comprises a forward flight command;

the step of controlling the driving module to adjust the mode of the first power module and controlling the first power module, the second power module, the third power module, the steering module, and the lifting module, comprises:

acquiring a current altitude of the UAV detected by the altitude sensor according to the forward flight command;

judging whether an altitude satisfies a preset altitude; and if the altitude satisfies a preset altitude, controlling powers of the two second power modules and two third power modules so that the UAV is in a hovering state, and controlling the driving module to adjust the two first power modules into a level flight mode so that the UAV flies forward.

19. The UAV according to claim 16, wherein:

the flight control command comprises a climbing command; and the step of controlling the driving module to adjust the mode of the first power module and controlling the first power module, the second power module, the third power module, the steering module, and the lifting module, comprises:

according to the climbing command, controlling the lifting module to deflect upwards and controlling the two first power modules to accelerate.

20. The UAV according to claim 16, wherein:

the flight control command comprises a descending command; and the step of according to the flight control command, controlling the driving module to adjust the mode of the first power module and controlling the first power module, the second power module, the third power module, the steering module, and the lifting module, comprises:

according to the descending command, controlling the lifting module to deflect downwards and controlling the two first power modules to decelerate.

* * * * *